United States Patent
Baumann et al.

(10) Patent No.: US 7,735,613 B2
(45) Date of Patent: Jun. 15, 2010

(54) SELF-BOOSTING ELECTROMECHANICAL FRICTION BRAKE

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE);
Bernd Goetzelmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 883 days.

(21) Appl. No.: 10/584,186

(22) PCT Filed: Nov. 19, 2004

(86) PCT No.: PCT/DE2004/002551
§ 371 (c)(1),
(2), (4) Date: Jun. 23, 2006

(87) PCT Pub. No.: WO2005/061920

PCT Pub. Date: Jul. 7, 2005

(65) Prior Publication Data
US 2007/0137949 A1    Jun. 21, 2007

(30) Foreign Application Priority Data
Dec. 24, 2003    (DE)    ............................... 103 61 265

(51) Int. Cl.
*F16D 55/08*    (2006.01)
(52) U.S. Cl. .................... 188/72.7; 188/71.8; 188/72.2; 188/70 B
(58) Field of Classification Search ................. 188/71.8, 188/72.2, 72.7, 70 B, 156, 162, 342, 343
See application file for complete search history.

(56) References Cited

U.S. PATENT DOCUMENTS

| 6,318,513 | B1 | 11/2001 | Dietrich et al. |
| 6,752,247 | B2 * | 6/2004 | Hartsock .................... 188/72.7 |
| 6,938,737 | B2 * | 9/2005 | Hartsock .................... 188/72.2 |
| 6,957,723 | B2 * | 10/2005 | Baumann et al. ........... 188/72.7 |
| 7,258,206 | B2 * | 8/2007 | Severinsson ............... 188/72.7 |
| 7,347,204 | B1 * | 3/2008 | Lindsey et al. ......... 128/202.13 |
| 2003/0205438 | A1 | 11/2003 | Hartsock |
| 2004/0178027 | A1 | 9/2004 | Hartsock |

FOREIGN PATENT DOCUMENTS

| DE | 198 19 564 A1 | 12/1999 |
| WO | WO 03/056204 A1 | 7/2003 |
| WO | WO 03/106857 A1 | 12/2003 |

* cited by examiner

Primary Examiner—Robert A Siconolfi
Assistant Examiner—Mariano Sy
(74) Attorney, Agent, or Firm—Ronald E. Greigg

(57) ABSTRACT

A self-boosting electromechanical friction brake, having a friction brake lining which is displaceable for actuation in the direction of rotation of a brake disk and which is braced via roller bodies on ramps of an abutment plate. When the brake is actuated, brake disk exerts a frictional force on the brake lining pressed against it, which urges the lining in the direction of an increasingly narrow gap between the ramps and the brake disk to exert a contact pressure that is in addition to that exerted by an actuation device to attain self-boosting. The roller bodies are supported fixedly and rotatably in bearing block on the brake lining whereby the roller bodies move in slaved fashion with the brake lining and always brace the brake lining at the same points.

14 Claims, 5 Drawing Sheets

SELF-BOOSTING ELECTROMECHANICAL FRICTION BRAKE

CROSS-REFERENCE TO RELATED APPLICATIONS

This application is a 35 USC 371 application of PCT/DE 2004/002551 filed on Nov. 19, 2004.

BACKGROUND OF THE INVENTION

1. Field of the Invention

The invention relates to an improved self-boosting electromechanical friction brake for a motor vehicle.

2. Description of the Prior Art

One friction brake of the type with which this invention is concerned is known from International Patent Disclosure WO 03/056204 A1. The known friction brake is embodied as a disk brake and has a friction brake lining, which for braking can be pressed by an electromechanical actuation device against a brake body to be braked; in the case of a disk brake, the brake body is a brake disk. The actuation device of the known friction brake has an electric motor, a step-down gear, and a screw drive as a rotation/translation conversion gear. With the actuation device, the friction brake lining can be moved transversely or at an angle obliquely to the brake disk and thus pressed against it. The construction of the actuation device can differ from the construction described here.

To attain self-boosting, the known friction brake has a ramp mechanism, with a ramp extending at an angle to the brake disk, on which ramp the friction brake lining is braced upon being pressed against the brake disk. If in braking the friction brake lining is pressed against the rotating brake disk, then the brake disk exerts a frictional force on the friction brake lining, which urges the friction brake lining in the direction of an increasingly narrow wedge-shaped gap between the ramp that supports the friction brake lining and the brake disk. The bracing of the friction brake lining on the ramp, extending obliquely to the brake disk, of the ramp mechanism exerts a force on the friction brake lining that has a force component transverse to the brake disk. This force component transverse to the brake disk is a contact pressure, which presses the friction brake lining against the brake disk. The contact pressure exerted by the ramp mechanism increases contact pressure exerted by the actuating device and thus increases a braking force of the friction brake. This increasing of the contact pressure and braking force is called self boosting.

An angle at which the ramp of the ramp mechanism extends relative to the brake disk can change over the course of the ramp. A special case or limit case of a ramp mechanism is a wedge mechanism in which the angle at which the ramp extends to the brake disk is constant over the course of the ramp. In this case, the ramp is called a wedge. A plurality of ramp mechanisms may be provided, which are distributed over a back side of the friction brake lining facing away from the brake disk and that brace the friction brake lining jointly.

In the known friction brake, balls or rollers are provided as roller bodies, by way of which the friction brake lining is braced on the ramp and which reduce friction upon displacement of the friction brake lining along the ramp. The roller bodies in the known friction brake roll on raceways that are provided on a back side, facing away from the brake disk, of the friction brake lining and on an abutment plate facing toward the friction brake lining. The raceways extend in the displacement direction of the friction brake lining and are at their lowest point at the center of their length; their depth decreases from the center of the length in both directions. As a result, the raceways form the ramp or ramps of the ramp mechanism. The raceways are mounted in sunken fashion in the back side of the friction brake lining and in the abutment plate; they guide the roller bodies, and via the roller bodies the friction brake lining, transversely to the displacement direction.

The self-boosting electromechanical friction brake has been described above in terms of a disk brake, because it can be explained clearly in terms of a disk brake since known friction brakes of this kind are predominantly embodied as disk brakes, and because even the friction brake named as prior art is a disk brake. This does not preclude the implementation of the invention in other types of brake.

If the friction brake lining of the known friction brake is pushed back and forth for braking and for releasing the brake, the roller bodies ideally roll along the raceways, and they are in their original position when the friction brake lining is also in its original position again. This is not true if in a self-boosting friction brake, to compensate for wear, the friction brake lining is not restored entirely. The "wandering away" or creeping described below of the roller bodies occurs nevertheless. It cannot be precluded that the roller bodies will not merely roll but will also slide on their raceways when the friction brake lining is pushed back and forth. In that case, the roller bodies no longer return to their original position. When the friction brake lining has been pushed back and forth many times, the roller bodies can creep farther and farther from their outset position.

SUMMARY AND ADVANTAGES OF THE INVENTION

In the friction brake of the invention, the roller bodies are supported fixedly and rotatably. Per roller body, there is only one ramp on which the roller body rolls. An associated second ramp, which is located diametrically opposite the first ramp and on which the roller body also normally rolls, the roller body being located between the two ramps, is dispensed with because of the rotatable support in accordance with the invention of the roller body. However, two and theoretically even more roller bodies per ramp are also possible. The rotatable support of the roller body has the advantage that the roller body is held fixedly and cannot creep away from its position. The location of the roller body is permanently determined by its rotational support. Unwanted creeping of the roller body in the direction of one end of the ramp from sliding on the ramp is precluded. Even if the roller body can slide on the ramp, it cannot move away from its position defined by the rotational support. Another advantage of the invention is that per roller body, only one ramp has to be hardened, since there is only one ramp per roller body. An additional advantage is that the ramp of the ramp mechanism, for the same displacement travel of the friction brake lining, is approximately twice as long as two associated, diametrically opposed ramps on both of which one roller body rolls. This makes the demands for manufacturing tolerances less stringent, and changes in the ramp angle can be achieved more simply and precisely by way of the length of the ramp. With a change in the ramp angle over the length of the ramp, the magnitude of the self boosting can be varied as a function of the displacement travel of the friction brake lining and thus as a function of an actuation and braking force. By means of a large ramp angle at the beginning of the ramp, for instance, and at the onset of the displacement of the friction brake lining, a high positioning speed of the friction brake lining transversely to the brake disk can be achieved, and by means of a small ramp angle at the end of the ramp, high self boosting with high braking force can be achieved.

The roller bodies of the ramp mechanism can be supported rotatably and fixedly on a stationary abutment of the ramp mechanism. The abutment is for instance fixedly located in a brake caliper; the ramps are located on the back side, facing away from the brake disk, of the friction brake lining. Conversely the roller bodies may be supported fixedly and rotatably on the friction brake lining; in this case, the ramps are located for instance on an abutment. In this embodiment of the invention, the roller bodies are stationary relative to the friction brake lining; that is, they do not move with the friction brake lining when the friction brake lining is moved for actuation of the brake. This embodiment of the invention is favored over the preceding one because the bracing of the friction brake lining via the roller bodies on the ramps does not shift relative to the friction brake lining upon actuation of the friction brake; that is, the bracing of the friction brake lining always occurs at the same places.

One embodiment provides that an imaginary straight line extending at the ramp angle, that is, perpendicular to the ramp, through an axis of rotation of a roller body intersects a surface of the friction brake lining, oriented toward the brake body, inside the surface of the friction brake lining. The intersection point of the imaginary straight line and the surface of the friction brake lining is the place where the bracing of the friction brake lining by the roller body is operative. Because of the ramp angle of the ramp, the bracing point is not vertical to the friction brake lining below the roller body but rather offset from this as a function of the ramp angle. The point where the bracing of the friction brake lining or the roller body is operative should according to this embodiment be located inside the surface of the friction brake lining oriented toward the brake body.

Another feature provides a transverse inclination of the axes of rotation of the roller bodies and the ramps on which the roller bodies roll and on which the roller bodies are braced, transversely to a displacement direction of the friction brake lining and to a circumferential direction of the brake body. The transverse inclination should be selected such that the roller bodies brace the friction brake lining centrally to an imaginary circular circumferential line that divides the surface, oriented toward the brake body, of the friction brake lining into two faces of at least approximately equal size. A center of the imaginary circular circumferential line is then located on the axis of rotation of the brake body. Radially inner and radially outer ramps have contrary transverse inclinations, and the transverse inclination angles may differ. If more roller bodies are located inside the imaginary circumferential line than outside it, then their transverse inclination and/or their spacing from the imaginary circumferential center line is less, and vice versa. The friction brake lining is braced centrally to the circumferential center line, and guidance of the friction brake lining transversely to its displacement direction, that is, radially to a brake disk, is brought about. The transverse inclination angles are preferably selected such that the result, at least approximately, is a transverse or radial equalization of force.

For reducing friction and wear, a roller bearing may be provided by the roller bodies themselves. Roller bearings of the roller bodies can be located in bearing pockets, that is, in indentations that are complementary to the roller bearings and that are made on the back side, facing away from the brake body, of the friction brake lining or in the stationary abutment.

One embodiment provides an offset of the roller bodies in the circumferential direction of the brake body or in the displacement direction of the friction brake lining. The offset should be selected such that the roller bodies brace the friction brake lining centrally to an imaginary center line, extending radially to the brake body or transversely to the displacement direction of the friction brake lining, that divides the surface, oriented toward the brake body, of the friction brake lining into two faces of approximately equal size. As a result, the friction brake lining is braced centrally to its displacement direction; the ramp inclination is compensated for. This embodiment of the invention corresponds to an embodiment discussed above pertaining to a transverse direction to the displacement direction of the friction brake lining, while this embodiment is directed to the longitudinal or displacement direction.

BRIEF DESCRIPTION OF THE DRAWINGS

The invention is described more fully herein below, in conjunction with the drawings, in which.

DESCRIPTION OF THE PREFERRED EMBODIMENTS

Figure 1:
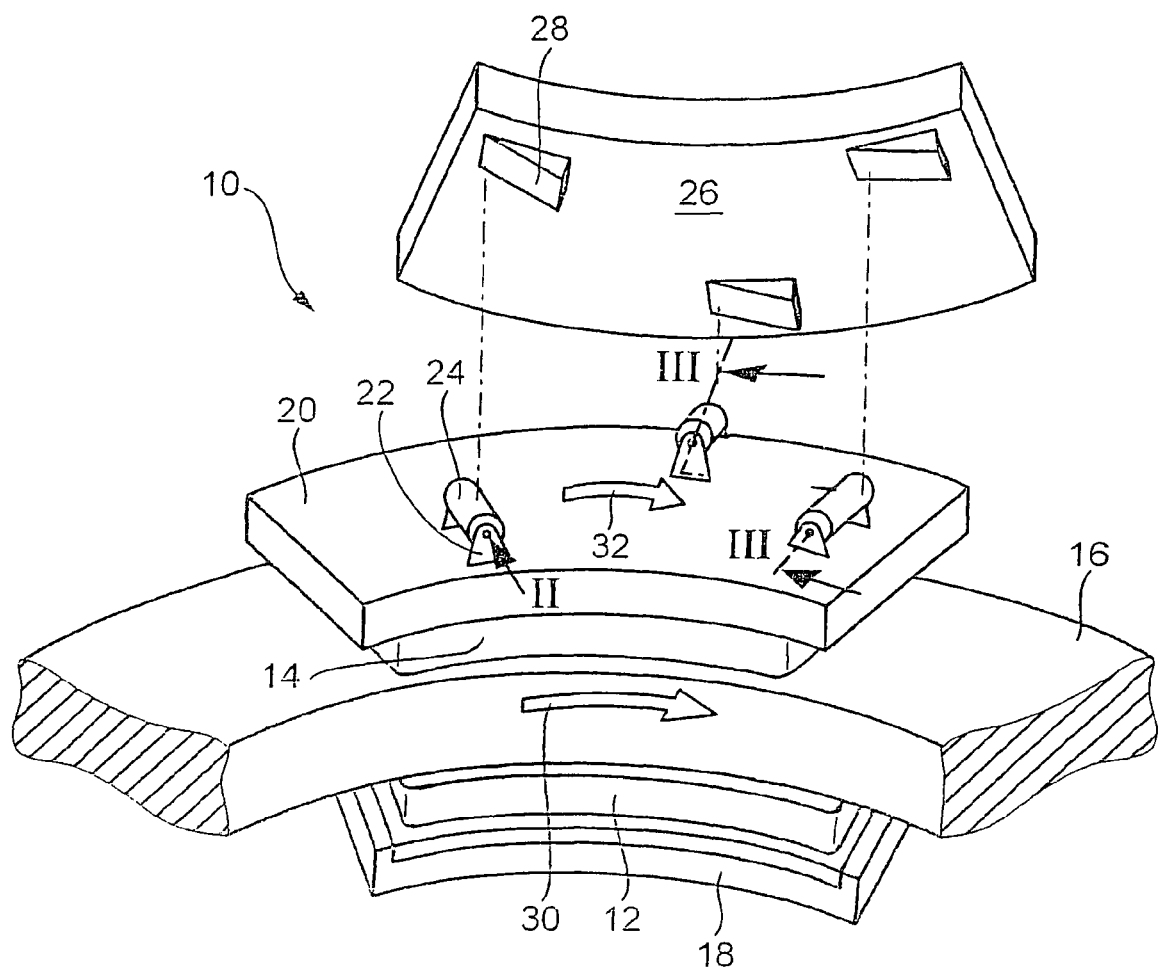
FIG. 1 is a simplified schematic perspective view of a self-boosting electromechanical friction brake of the invention.

FIG. 1 schematically shows a self-boosting electromechanical friction brake 10 of the invention, which is embodied as a disk brake. The friction brake 10 has two friction brake linings 12, 14, which are located one on either side of a brake disk 16. One of the two friction brake linings 12 rests firmly, that is, immovably, in a brake caliper 18. This friction brake lining 12 will hereinafter be called the fixed friction brake lining 12. Of the brake caliper 18, only a part located below the brake disk 16 in terms of the drawing is shown, because a part of the brake caliper 18 located above the brake disk 16 would conceal the essential parts of the friction brake 10. The brake caliper 18 fits as usual over the brake disk 16 outside the circumference of the latter.

The other friction brake lining 14 is movable in a direction of rotation and transversely to the brake disk 16. The phrase "in the direction of rotation of the brake disk 16" means that the movable friction brake lining 14 is rotatable about an imaginary axis, which coincides at least approximately with an axis of rotation of the brake disk 16. In principle, a displaceability of the movable friction brake lining 14 in a secant direction to the brake disk 16 is also possible. The motion of the friction brake lining 14 for actuating the friction brake 10 is effected with an electromechanical actuation device, which is not shown, for the sake of clarity in the drawing. Such actuation devices are familiar from the prior art, in various constructions, to one skilled in the art, and since they do not form the actual subject of the invention, they will not be described in detail here.

The friction brake lining 14 is connected as usual fixedly and nondetachably to a brake lining holder plate 20. On a back side facing away from the brake disk 16, the brake lining holder plate 20 has bearing blocks 22, in which roller bodies 24 are rotatably supported. In the exemplary embodiment of the invention shown and described, rollers are used as roller bodies 24. Axes of rotation of the rollers 24 extend radially to an axis of rotation of the brake disk 16. However, it is not compulsory that the axes of rotation of the roller bodies 24 be radial to the axis of rotation of the brake disk 16. For instance, if the friction brake lining 14 is to be displaced in a secant direction to the brake disk 16, then the axes of rotation of the roller bodies 24 extend parallel to one another and perpendicular to the secant. With the bearing blocks 22, the roller bodies 24 are supported fixedly and rotatably on the movable friction brake lining 14; upon displacement of the friction brake lining 14, the roller bodies 24 move along with the friction brake lining 14.

On a front side of an abutment plate 26, oriented toward the brake disk 16, there are ramps 28 on which the roller bodies 24 are braced and on which the roller bodies 24 roll. The ramps 28 extend in the circumferential and direction of rotation of the brake disk 16 and thus in the displacement direction of the friction brake lining 14. The ramps 28 rise in the direction of rotation of the brake disk 16.

The abutment plate 26 is approximately coincident with the brake lining holder plate 20, on the back side of that plate facing away from the brake disk 16. In FIG. 1, the abutment plate 26 is shown rotated upward, to make the ramps 28 and the roller bodies 24 visible. In actuality, the abutment plate 26 is located parallel to the friction brake linings 12, 14 of the brake disk 16 and the brake lining holder plate 20. The abutment plate 26 is located fixedly, that is, immovably, in the part of the brake caliper 18, not shown, that fits over the brake lining holder plate 20 on its back side facing away from the brake disk 16. This part of the brake caliper 18 that is not shown is located above the brake disk 16 and above the brake lining holder plate 20 in FIG. 1. The brake caliper 18 is embodied as a so-called floating caliper; that is, it is displaceable transversely to the brake disk 16. When the movable friction brake lining 14 is pressed against the brake disk 16, the brake caliper 18 is displaced transversely to the brake disk 16 and presses the fixed friction brake lining 12 against the other side of the brake disk 16, so that the brake disk 16 is braked by both friction brake linings 12, 14.

For actuating the friction brake 10, the movable friction brake lining 14 is displaced in the direction of rotation of the brake disk 16. The direction of rotation of the brake disk 16 is represented in FIG. 1 by the arrow 30, and the displacement direction of the friction brake lining 14 is represented by the arrow 32 on the brake lining holder plate 20. Upon the motion of the friction brake lining 14 in the direction of rotation 30 of the brake disk 16, the roller bodies 24 roll on the ramps 28. Because of the rise of the ramps 28, upon the motion in the direction of rotation 30 of the brake disk 16 the friction brake lining 14 is moved transversely toward the brake disk 16 and pressed against it. The brake disk 16 is braked. The rotating brake disk 16 exerts a frictional force in the direction of rotation 30 on the friction brake lining 14 pressed against it, and this force urges the friction brake lining 14 in the direction of rotation 30 of the brake disk 16 and thus in its direction of motion 32. By way of the bracing on the ramps 28, the action on the friction brake lining 14 along with the frictional force in the direction of rotation 30 of the brake disk 16 brings about a supporting force that is perpendicular to the ramps 28 and that has a component transversely to the brake disk 16. This force component transversely to the brake disk 16 forms a contact pressure, which in addition to a contact pressure exerted by the actuation device presses against the brake disk 16. The braking force of the friction brake 10 is boosted as a result.

The ramps 28 extend at what is typically an acute ramp angle to the brake disk 16. The ramp angle may vary over the course of the ramps 28, or in other words in their longitudinal direction. If the ramp angle is constant over the length of the ramps 28, the ramps also called wedges. The ramps 28 form a ramp mechanism, which brings about the self boosting of the friction brake 10.

In the exemplary embodiment shown, three roller bodies 24 are disposed on the brake lining holder plate 20, and three ramps 28 are disposed on the abutment plate 26. This produces a statically balanced or determined bracing of the friction brake lining 14. A statically overdetermined bracing with more than three roller bodies 24 and ramps 28 is conceivable. Fewer than three roller bodies 24 and ramps 28 are also possible, for instance if two roller bodies 24 and two ramps 28 extend (not shown) over a substantial width of the brake lining holder plate 20.

In the exemplary embodiment shown in FIG. 1, the ramps 28 rise in only one direction of rotation 30 of the brake disk 16; that is, the friction brake 10 has self boosting only for the direction of rotation of the brake disk 16 represented by the arrow 30. In the opposite direction of rotation of the brake disk 16, no self boosting takes place. To attain self boosting for the opposite direction of rotation of the brake disk 16 as well, ramps may be provided (not shown) that rise in the opposite direction. By means of different ramp angles, various magnitudes of self boosting can be attained in the two direction of rotations of the brake disk 16, or in other words for travel forward and in reverse.

Figure 2:
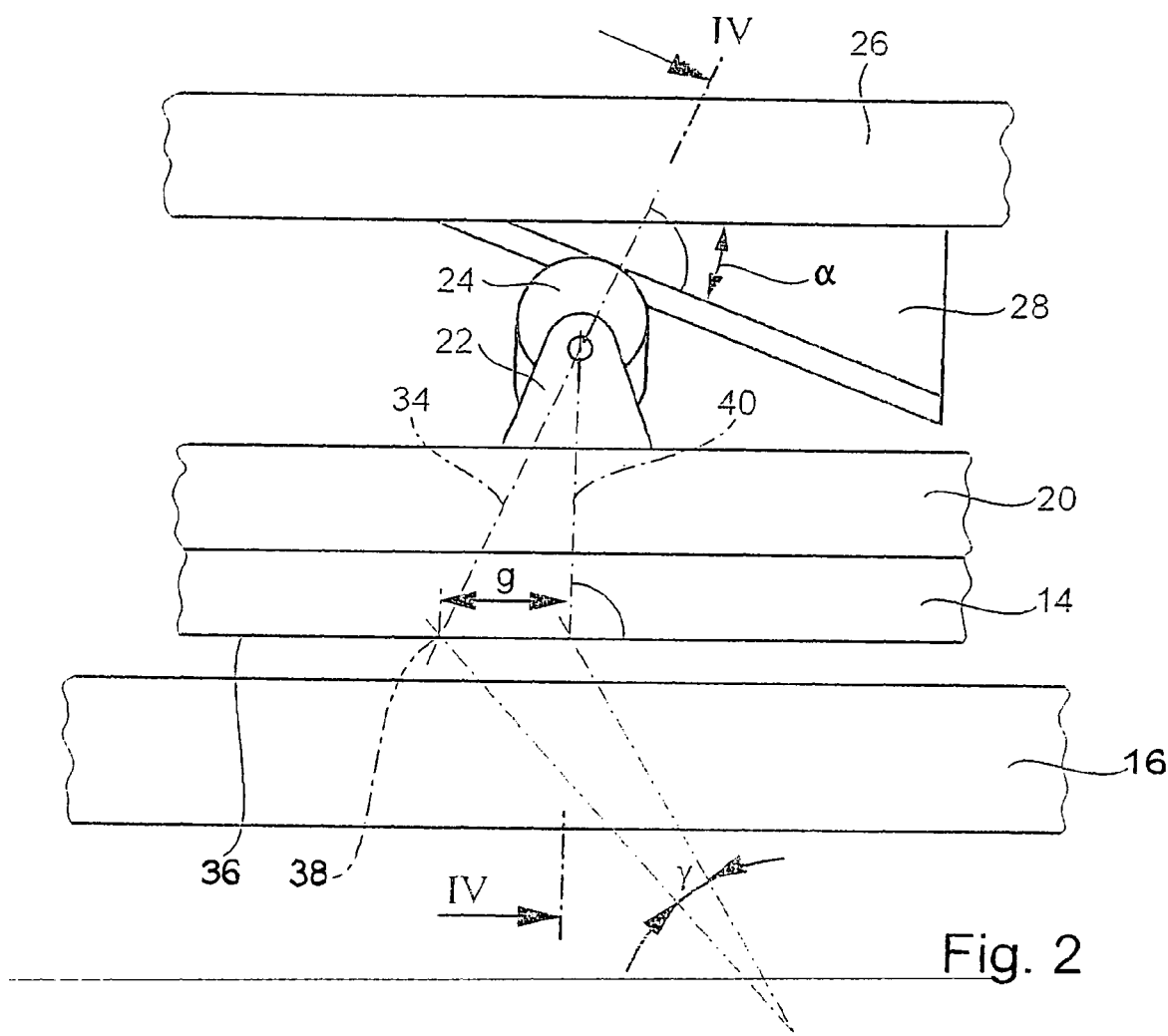
FIG. 2, an enlarged detail of the friction brake of FIG. 1, looking in the direction of the arrow II in FIG. 1 at one face end of a roller body.

In FIG. 2, a roller body 24 embodied as a roller can be seen enlarged, looking axially toward the roller body 24. The abutment plate 26 can be seen along with the ramp 28 on which the roller body 24 rolls. The ramp 28 is embodied as a wedge, with a constant wedge angle or ramp angle a over a full length of the ramp 28. Also visible in FIG. 2 are the brake lining holder plate 20 with the friction brake lining 14, on its front side oriented toward the brake disk 16, and the bearing block 22, on its back side facing away from the brake disk 16 and toward the abutment plate 26. The roller body 24 is supported rotatably on the bearing block 22 and thus fixedly on the brake lining holder plate 20 and the friction brake lining 14.

In FIG. 2, dot-dashed lines represent a straight line 34 that extends radially through an axis of rotation of the roller body 24. The straight line 34 is perpendicular to the ramp 28; it passes through the point at which the roller body 24 is braced on the ramp 28. The straight line 34 intersects a surface 36, oriented toward the brake disk 16, of the friction brake lining 14 at an intersection point 38, which indicates an effective bracing point of the friction brake lining 14 by means of the roller body 24. Because of the bracing of the roller body 24 by the ramp angle a. on the ramp 28, the effective bracing point 38 is not located vertically below the roller body 24, but instead is offset by the distance g in the circumferential direction of the brake disk 16 and in the displacement direction of the friction brake lining 14. This direction can also be called the longitudinal direction of the friction brake lining 14. The roller bodies 24 are located such that the aforementioned intersections 38 are located inside the surface 36, facing toward the brake disk 16, of the friction brake lining 14. The roller bodies 24 are moreover distributed over the back side of the brake lining holder plate 20 in such a way that they brace the friction brake lining 14 centrally relative to an imaginary transverse center line 40 which extends radially to the brake disk 16 and divides the surface 36, toward the brake disk 16, of the friction brake lining 14 into two faces of approximately equal size. As a result, over the surface area of the friction brake lining 14, a uniformly distributed bracing of the friction brake lining 14 with respect to its longitudinal and displacement direction is attained. The offset g in the longitudinal or circumferential direction can also be called the offset angle γ in the plane of the surface 36, oriented toward the brake disk 16. of the friction brake lining 14. An apex of the offset angle γ is located on the axis of rotation of the brake disk 16.

Figure 3:
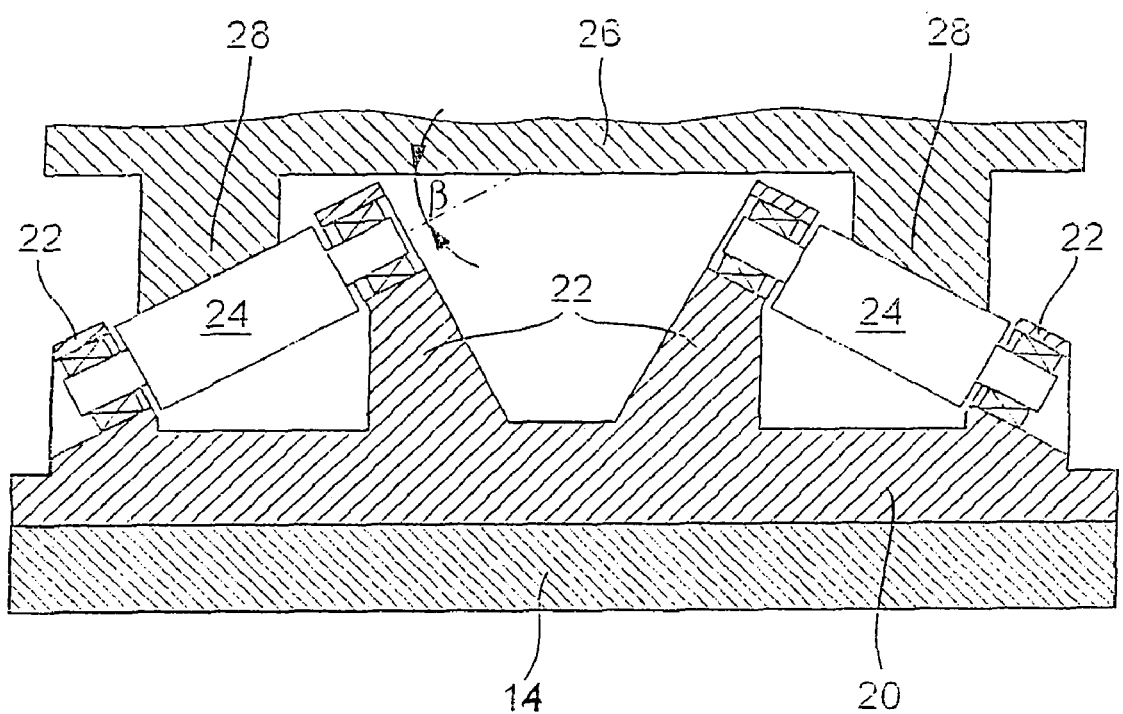
FIG. 3, an axial section through one radially inner and one radially outer roller body of the friction brake of FIG. 1 along the line 111-111, which changes angle twice, in FIG. 1.
Figure 4:
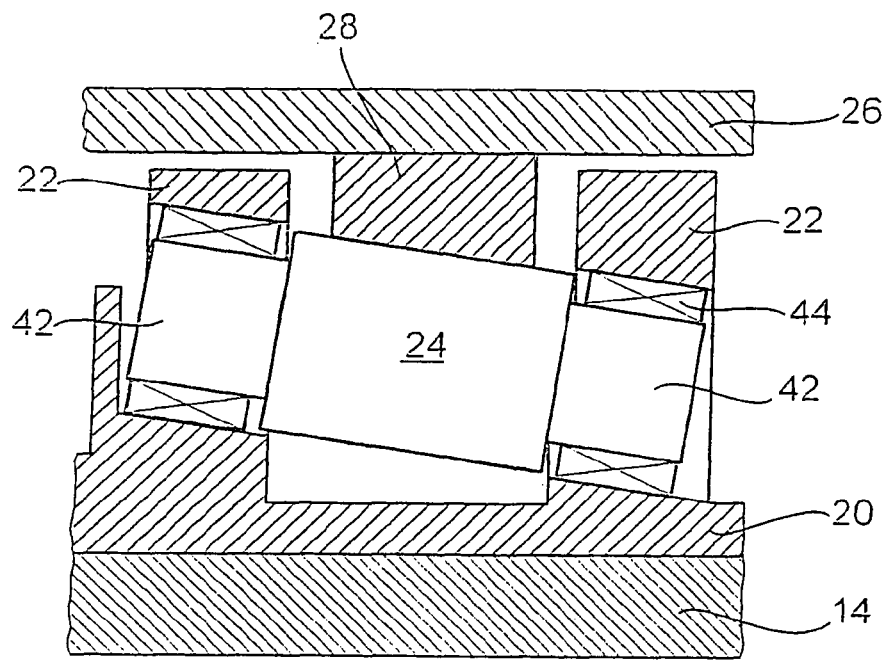
FIGS. 4 through 7 show various possible embodiments of roller bearings of a friction brake lining of the friction brake of FIG. 1 according to the invention, in an angled sectional plane shown at IV-IV in FIG. 2.

FIG. 3 shows one radially inner and one radially outer roller body 24. It can readily be seen that the roller bodies 24 are inclined transversely to the displacement direction of the friction brake lining 14. The radially inner roller bodies 24 are inclined oppositely to a radially outer roller body 24, which is located between the radially inner roller bodies 24 in the circumferential direction. The ramps 28 have the same transverse inclination as the respective associated roller body 24. The transverse inclination angle β of the radially inner roller bodies 24 are the same, but a transverse inclination angle β of the radially outer roller body 24 is greater, so that shear forces compensate for one another. The transverse inclination angle β of the roller bodies 24 and of the ramps 28 effects a guidance of the friction brake lining 14 transversely to its displacement direction, or in other words radially to the brake disk 16. Because of the bracing of the friction brake lining 14 with three roller bodies 24 and three ramps 28, which are located at the corners of an imaginary triangle, a statically determined bracing and guidance of the friction brake lining 14 transversely to its displacement direction and radially to the brake disk 16 is obtained. The transverse inclination of the ramps 28 and of the roller bodies 24 is selected such that they brace the friction brake lining 14 centrally to an imaginary circular circumferential line whose center is located on the axis of rotation of the brake disk 16.

FIGS. 4 through 7 show various exemplary embodiments of roller bearings, according to the invention, which support the roller bodies 24. Axial sections of the roller bodies 24 are shown in the sectional plane that is angled and is represented by the line IV-IV in FIG. 2. In the exemplary embodiment shown in FIG. 4, the roller body 24 is a cylindrical roller with journals 42, axially protruding on both sides, which are supported rotatably by needle bearings 44 in the bearing blocks 22 of the brake lining holder plate 20. The ramp 28 on which the roller body 24 rolls is narrower than a spacing of the two bearing blocks 22 from one another; the ramp 28 reaches between the bearing blocks 22.

Figure 5:
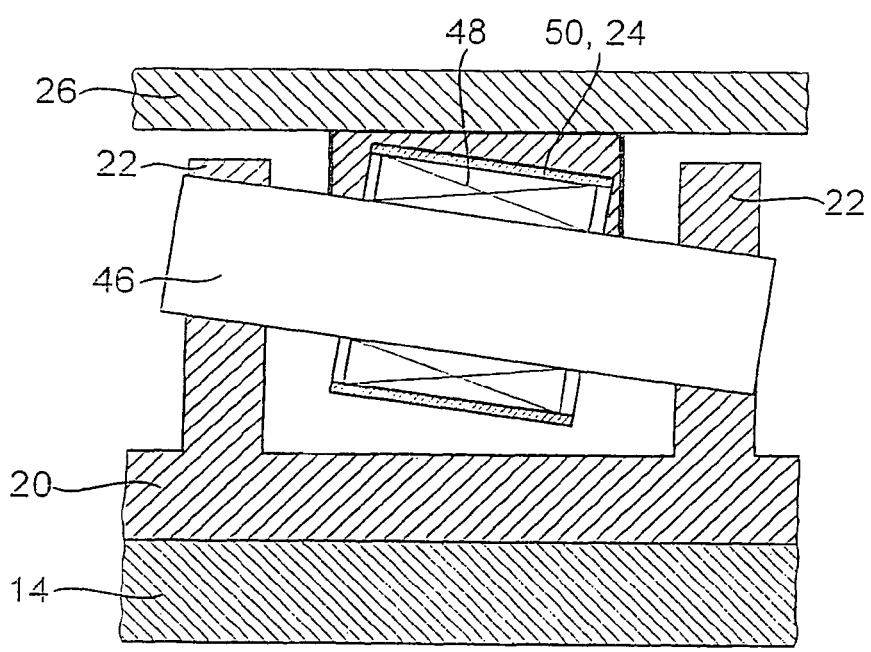

In the exemplary embodiment shown in FIG. 5, a dowel, for instance, is press-fitted as a shaft 46 into the two bearing blocks 22. On the shaft 46, with a needle bearing 48, a sleeve 50 is rotatably supported and forms the roller body 24 which rolls on the ramp 28, not visible in FIG. 5. The sleeve 50 forms an outer ring of the needle bearing 48. The roller bearing support of the roller body 24 shown in FIG. 5 has the advantage that it makes do with comparatively few parts to be produced and with standard parts. For instance, a graduated roller body 24 is not needed.

Figure 6:
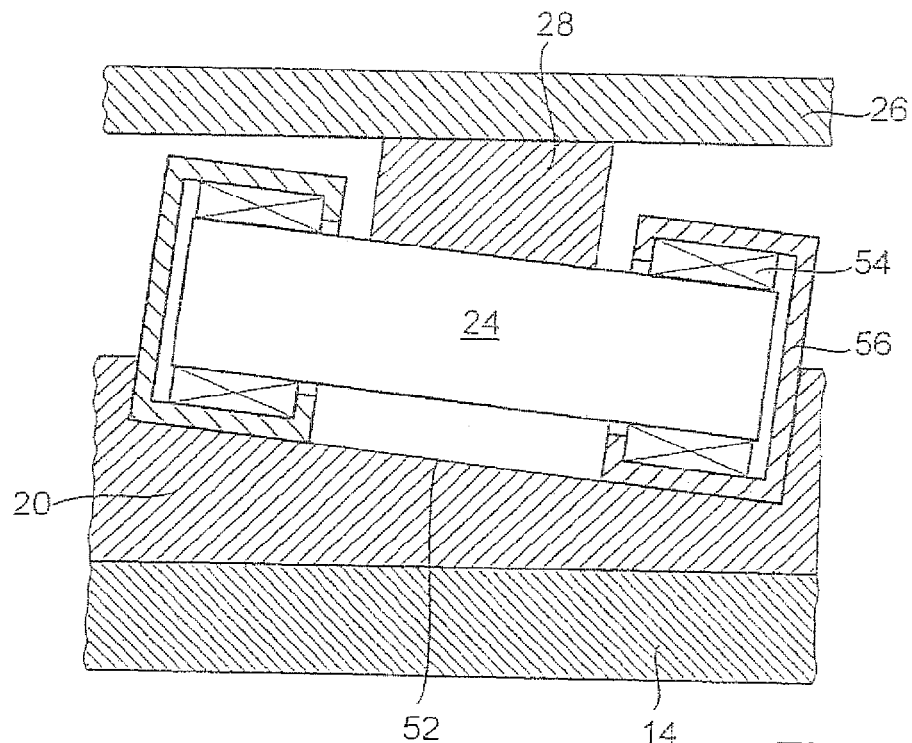
Figure 7:
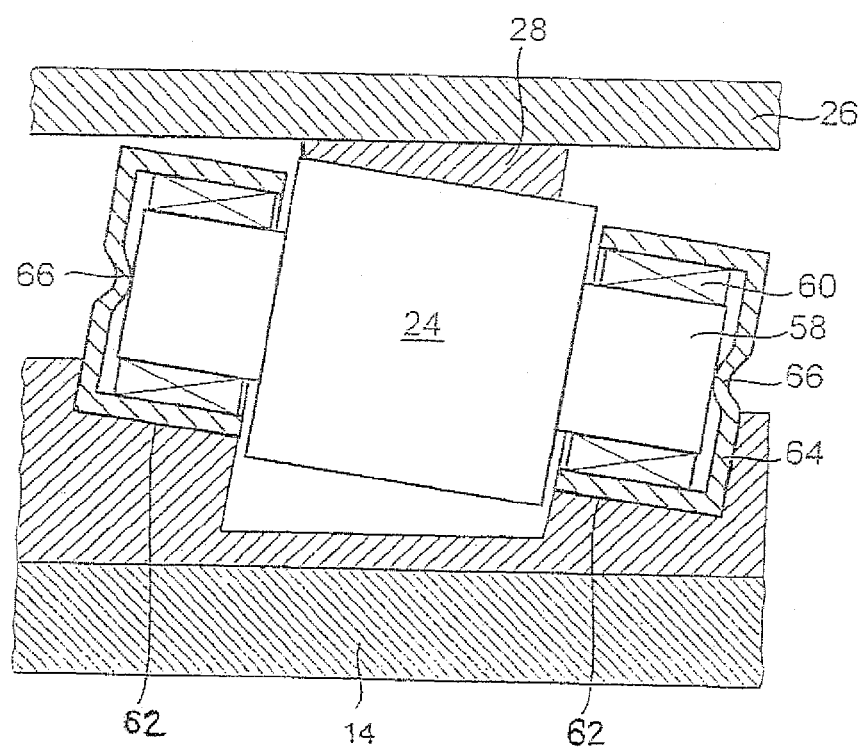

In the roller bearing support of the roller bodies 24 shown in FIG. 6, the back side of the brake lining holder plate 20 is provided with pockets 52, in which needle bearings 54 rest. The pockets 52 are cylindrical indentations in the brake lining holder plate 20 that have the same diameter as sleeves 56 of the needle bearings 54. The bearing blocks 22 per se are omitted. The roller body 24 is for instance a cylindrical pin, which is rotatably supported in the needle bearings 54. The ramp 28 on the abutment plate 26 is narrower than a spacing of the needle bearings 54 from one another and reaches between the needle bearings 54. This embodiment of the roller bearing of the roller body 24 can likewise be manufactured inexpensively, with parts that are simple to produce and with standard parts. No bores in bearing blocks are needed. Assembly is also simplified.

In the embodiment of the roller bearing support of the roller bodies 24 shown in FIG. 7, once again a graduated-diameter, rollerlike roller body 24 with laterally protruding journals 58 is used, which is rotatably supported in needle bearings 60. The needle bearings 60 rest, as in FIG. 6, in a pocket 62 in the brake lining holder plate 20. Since because of its larger diameter in the middle region the roller body 24 keeps the needles of the needle bearings 60 in the bearing sleeves 64, the bearing sleeves 64 need not be crimped over inward on their open inside. For the same total structural width as in the roller bearing shown in FIG. 5, axially longer needle bearings 60 can be used, resulting in a higher load-bearing coefficient in comparison with the roller bearing shown in FIG. 6. For axial guidance of the roller body 24, the bearing sleeves 64 have inclines 66. These are inward-oriented concavities in the middle of end faces of the bearing sleeves 64.

The foregoing relates to a preferred exemplary embodiment of the invention, it being understood that other variants and embodiments thereof are possible within the spirit and scope of the invention, the latter being defined by the appended claims.

The invention claimed is:

1. A self-boosting electromechanical friction brake, comprising
   a friction brake lining which is movable in a direction of rotation and into contact with a brake body,
   an electromechanical actuation device with which the friction brake lining can be pressed for braking against the brake body,
   a ramp mechanism which braces the friction brake lining at a ramp angle to the brake body, the ramp mechanism having a roller bearing that has roller bodies, with which roller bearing the friction brake lining is movably supported at a wedge angle to the brake body, and roller support means supporting the roller bodies fixedly and rotatably on a component of the friction brake,
   wherein axes of rotation of the roller bodies have a transverse inclination, so that the roller bodies brace the friction brake lining centrally to an imaginary circular circumferential line with its center on an axis of rotation of the brake body which divides a surface, oriented toward the brake body, of the friction brake lining into two faces of at least approximately equal size.

2. The friction brake according to claim 1, wherein the roller support means comprises a stationary abutment of the ramp mechanism, and wherein the abutment braces the friction brake lining at the ramp angle to the brake body.

3. The friction brake according to claim 1, wherein the roller support means support the roller bodies in stationary and rotatable fashion on the friction brake lining.

4. The friction brake according to claim 1, wherein an imaginary straight line through an axis of rotation of a roller body, which imaginary straight line is perpendicular to a ramp, intersects the surface of the friction brake lining, oriented toward the brake body, inside the surface of the friction brake lining.

5. The friction brake according to claim 1, wherein the roller support means comprises roller bearings.

6. The friction brake according to claim 5, wherein the roller bearings of the roller bodies rest in bearing pockets that are complementary to the roller bearings.

7. The friction brake according to claim 1, wherein the friction brake is a partly lined disk brake.

8. The friction brake according to claim 1,
wherein the roller bodies are offset in a displacement direction of the friction brake lining such that the roller bodies brace the friction brake lining centrally to an imaginary center line, which extends transversely to the displacement direction of the friction brake lining and divides the surface, oriented toward the brake body, of the friction brake lining into two faces of at least approximately equal size.

9. The friction brake according to claim 8, wherein the roller support means comprises a stationary abutment of the ramp mechanism, and wherein the abutment braces the friction brake lining at the ramp angle to the brake body.

10. The friction brake according to claim 8, wherein the roller support means support the roller bodies in stationary and rotatable fashion on the friction brake lining.

11. The friction brake according to claim 8, wherein an imaginary straight line through an axis of rotation of a roller body, which imaginary straight line is perpendicular to a ramp, intersects the surface of the friction brake lining, oriented toward the brake body, inside the surface of the friction brake lining.

12. The friction brake according to claim 8, wherein the roller support means comprises roller bearings.

13. The friction brake according to claim 12, wherein the roller bearings of the roller bodies rest in bearing pockets that are complementary to the roller bearings.

14. The friction brake according to claim 8, wherein the friction brake is a partly lined disk brake.

* * * * *